United States Patent

[11] 3,625,612

[72] Inventors John A. Decker, Jr.
 Concord, Mass.;
 Martin O. Harwit, Ithaca, N.Y.; Domenico S. Sarcia, Saugus, Mass.
[21] Appl. No. 840,900
[22] Filed July 11, 1969
[45] Patented Dec. 7, 1971
[73] Assignee Comstock & Wescott, Inc.
 Cambridge, Mass.

[54] OPTICAL DEROTATOR EMPLOYING MIRROR PAIRS TO VIEW A ROTATING BODY
 8 Claims, 9 Drawing Figs.

[52] U.S. Cl. .................................................. 356/24
[51] Int. Cl. .................................................. G01p 3/40
[50] Field of Search ........................................ 350/301; 356/23, 24, 25

[56] References Cited
 UNITED STATES PATENTS
 3,471,236 10/1969 Pearson .................... 356/24

FOREIGN PATENTS
 263,797 9/1913 Germany
 698,035 10/1940 Germany

*Primary Examiner*—Ronald L. Wibert
*Assistant Examiner*—Orville B. Chew, II
*Attorney*—Roberts, Cushman & Grover ABSTRACT: For viewing an object rotating about an axis at a predetermined angular velocity to make the object appear stationary, apparatus comprising mirrors for reflecting rays from the object to a viewing location, the mirrors comprising one or more pairs of reflectors, the reflecting surfaces of each pair including an angle less than 180° for reflecting incident light from one reflector to the other and thence to said location, the angle being equal to 180° divided by an even number, one of the pairs comprising a derotator rotatable in the direction opposite to that of the object, the sum of the absolute values of the angular velocities of all the pairs equaling one-half the absolute value of the angular velocity of the object.

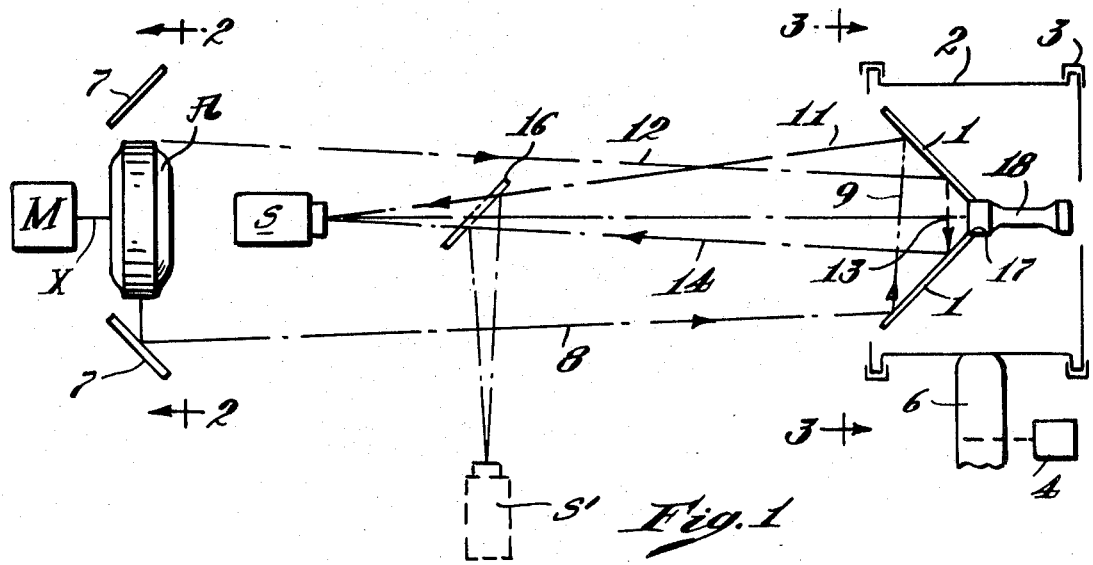
Fig. 1
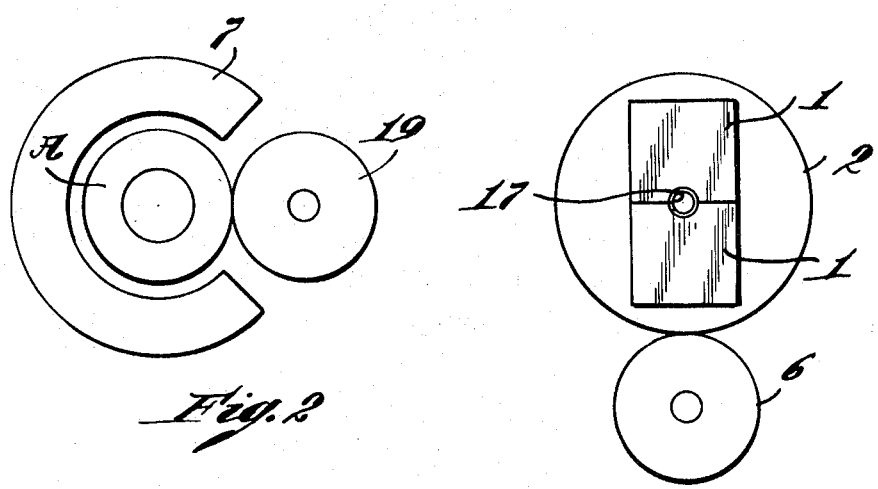
Fig. 2
Fig. 3
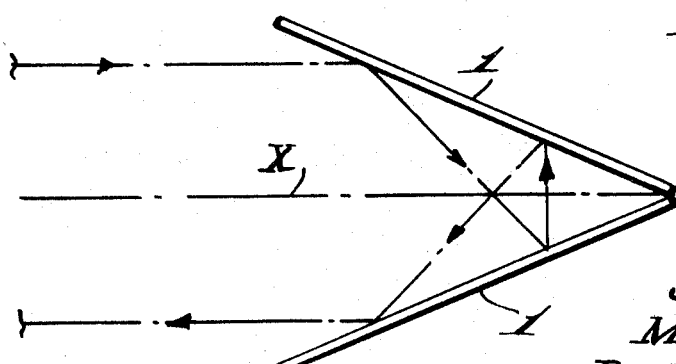
Fig. 4
Inventors
John A. Decker, Jr.
Martin O. Harwit
Domenico S. Garcia
by Roberts, Cushman & Grover
Attys

OPTICAL DEROTATOR EMPLOYING MIRROR PAIRS TO VIEW A ROTATING BODY

In the study of pneumatic tires for vehicles, turbine rotors, bearings, and other rotating objects, it is often important to determine the temperatures on their surfaces while the objects are being tested. The measurement of changing temperature patterns has been awkward and unsatisfactory. The usual temperature-measurement devices, such as thermocouples, thermistors, etc., require lead wires and slipring assemblies to conduct signals from the measurement device to stationary indicating instrumentation. Furthermore these devices measure the temperature of very small areas; hence large numbers must be used if detailed knowledge of temperature gradients is desired.

A more satisfactory device for measuring temperature gradients on a surface is an infrared scanning camera, such as that known by the trade name "AGA Thermovision," which senses infrared radiation emanating from a surface without physical contact. However it is not suitable for scanning rapidly rotating objects.

Objects of the invention are to provide apparatus which views a rotating article as though it were stationary, which is useful with high angular velocities, which is usable at infrared wavelengths where the use of prisms or lenses is precluded by the absorption of the radiation by the material of said lens or prism, which is simple and economical to produce and which is durable and reliable in use.

According to this invention the apparatus comprises means for reflecting rays from the rotating object to a viewing location, said means comprising a predetermined number of plane reflectors arranged in pairs, each pair constituting a derotator, the reflecting surfaces of each pair including an angle less than 180° for reflecting incident light from one reflector to the other and thence to said location, said angle being equal to 180° divided by an even number. For use with infrared light the reflecting means should not absorb infrared light substantially; for example the reflecting surfaces may be disposed wholly in air. Said location may be in a plane intersecting said axis intermediate the object and derotator, that is on the axis or on one side of the axis with a mirror to deflect the light from the axis, or it may be behind an opening in one of the pairs of reflectors. With one derotator the aforesaid velocity is one-half the velocity of the object. With more than one derotator the sum of the absolute magnitudes of the angular velocities of the derotators should be equal to one-half the absolute value of the angular velocity of the object. With two derotators the first to receive rays from the object should rotate in the same direction as the object and the second derotator should rotate in the opposite direction. Said angle may be 90°, 45°, 30°, 22½°, etc. The object may be viewed either by eye or by a sensor such as an infrared camera, a television camera or other scanner. The derotator may carry a telescope directed toward the center of the object when the object is centered on said axis, either through the aforesaid opening in the derotator or along said axis from one side of the derotator obliquely to said axis, to assist in centering the object on the axis. In the preferred embodiments the aforesaid angle is bisected by the aforesaid axis.

For the purpose of illustration typical embodiments of the invention are shown in the accompanying drawings in which FIG. 1 is a diagrammatic plan view of one embodiment;

FIG. 2 is a section on line 2—2 of FIG. 1;

FIG. 3 is a section on line 3—3 of FIG. 1;

FIGS. 4, 5, 6 and 7 are diagrammatic plan views of modifications;

Figure 5:
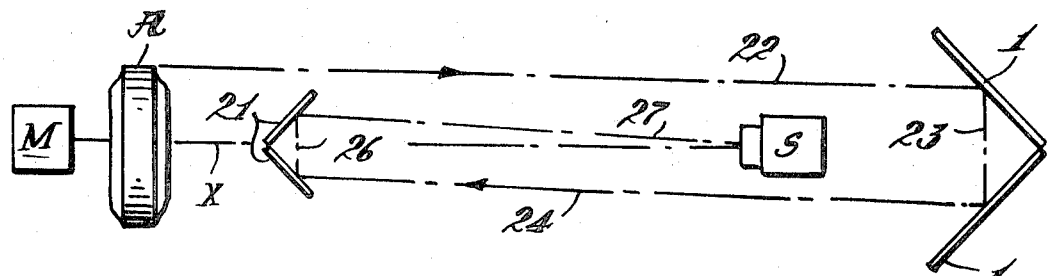

In FIG. 1 the object A to be tested is an automobile tire rotated about the axis X by a motor M. Coaxial with the tire is a derotator comprising two plane mirrors 1 making an angle of 90° with each other and angles of 45° with the axis X. The derotator comprises a cylindrical carriage 2 rotating in cylindrical tracks 3 which is driven by a motor 4 through the medium of a friction wheel 6. Each ray of radiation emanating radially from the tire A is reflected by a conical reflector 7 to one of the derotator mirrors 1 along path 8 thence to the other derotator mirror along path 9 and thence to a sensor S along path 11. Each ray from the side of the tire travels to one of the derotator mirrors along path 12 thence to the other derotator mirror along path 13 and thence to the sensor along path 14. Instead of locating the sensor on the axis X it may be located to one side as indicated at S' with a mirror 16 to reflect the rays 11 and 14 to it. The reflectors 1 may be provided with an opening 17 at the intersection and a telescope 18 may be mounted on the derotator behind the opening for use in centering the tire on the axis X, it being understood that the sensor S and reflector 16 would be removed during the centering operation. With only one pair of reflectors 1 the derotator is rotated at half the speed of the object A and in the same direction. As shown in FIG. 2 the tire may be rotated by a friction wheel 19 bearing on its periphery.

The modification shown in FIG. 4 is like that shown in FIG. 1 except that the angle between the derotator reflectors 1 includes an angle of 45° instead of 90°.

In FIG. 5 the apparatus is provided with a second pair of plane reflectors 21 facing the reflectors 1 so that each ray from the object A travels through the sensor S along paths 22, 23, 24, 26 and 27. Either or both of the pairs of reflectors may be rotary. If one pair is stationary and the other rotary the rotary pair should rotate at an angular velocity equal to half of that of the object A and in the same direction as in FIG. 1. If both pairs rotate the first pair 1 should rotate in the same direction as the object and, as previously stated, the second pair 21 should rotate in the opposite direction according to standard convention because, as shown in FIG. 5, the second pair 21 faces opposite to the first pair 1. Stated another way without respect to the direction in which the pairs are facing, the pairs 1 and 21 rotate in the same direction as though they were on a common axle. Using either the conventional method of designating direction of rotation or the common axle example, both pairs of mirrors 1 and 21 are rotating in a direction to reduce the apparent rotational speed of the object, and the sum of the absolute magnitudes of the angular velocities of the two pairs should be one-half the absolute magnitude of the angular velocity of the object.

Figure 6:
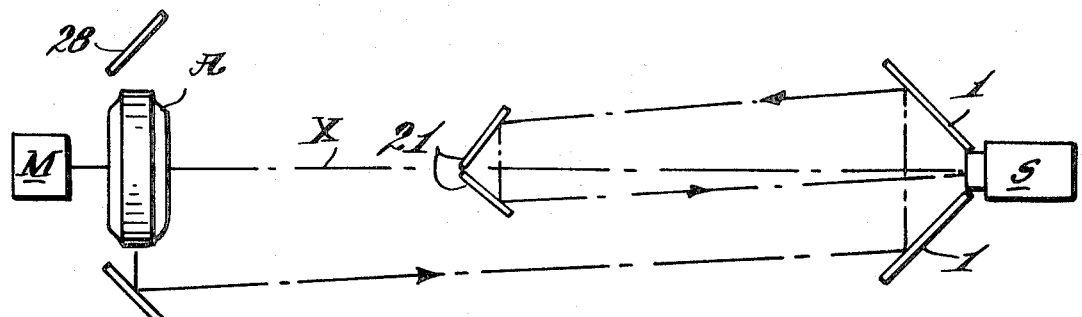

FIG. 6 is like FIG. 5 except in that a conical mirror 28 like 7 of FIG. 1 is provided and the reflectors 1 are provided with a central opening like 17 in FIG. 3 and the sensor S is disposed behind the opening.

Figure 7:
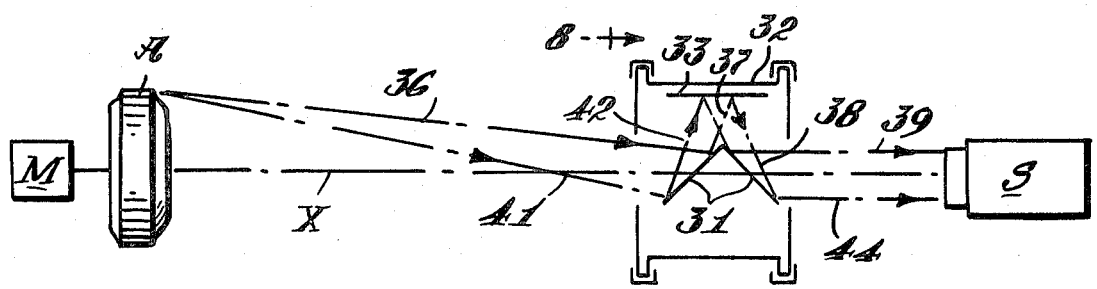
Figure 8:
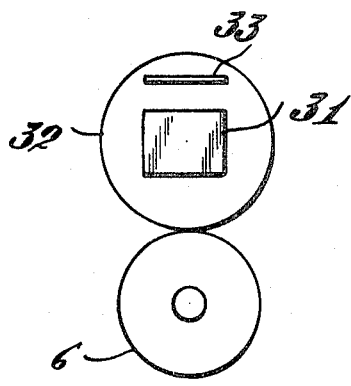
FIG. 8 is a section on line 8—8 of FIG. 7.

The modification shown in FIGS. 7 and 8 is like the embodiment shown in FIG. 1 with the following exception. The derotator 32, corresponding to 2 in FIG. 1, is disposed between the object A and the sensor S, the reflecting surfaces 31 of the derotator are disposed on the outside instead of the inside of the included angle and a third plane reflector 33 is provided. Thus ray 36 is reflected from the first reflector 31 along path 37 to the reflector 33 thence along path 38 to the other reflector from the first reflector 31 along path 42 to reflector 33 thence along path 43 to the other reflector 31 and thence along path 44 to the sensor.

Figure 9:
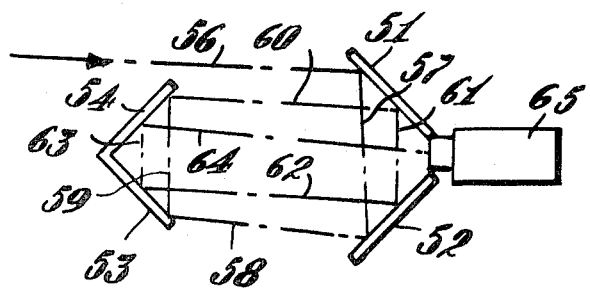
FIG. 9 is a diagrammatic plan view of another modification.

As shown in FIG. 9 two pairs of reflectors 51–52 and 53–54 may be spaced for multiple reflections therebetween, in which case one pair rotates at one-half the angular velocity of the object divided by the number of reflections off of each pair. In FIG. 9 the number of reflections off each pair of reflectors is two so that the rotating pair of reflectors rotates at one-fourth the velocity of the object. A ray 56 from the object is reflected back and forth along paths 57–58–59–60–62–63 and thence to the sensor 65 along path 64.

We claim:

1. For viewing an object rotating about an axis at a predetermined angular velocity, apparatus comprising means for reflecting rays from the object to a viewing location, said means comprising a predetermine number of plane reflectors arranged in one or more pairs, the reflecting surfaces of each pair including an angle less than 180° for reflecting incident light directly from one reflector to the other and thence toward said location, said angle being equal to 180° divided by an even number, means for rotating one or more of said pairs on the axis bisecting the angle between each pair in a direction to reduce the apparent rotational velocity of the object, at least one pair being rotated in the same direction as the object, the sum of the absolute values of the angular velocities of all the pairs equaling one-half the absolute value of the angular velocity of the object.

2. Apparatus according to claim 1 wherein said reflecting means is highly reflective in the infrared.

3. Apparatus according to claim 1 wherein said angle is 90°.

4. Apparatus according to claim 1 further characterized by a telescope on the means for rotating directed toward the center of the object when the object is centered on said axis.

5. Apparatus according to claim 1 wherein said one pair of reflectors has an opening on said axis through which the object is viewed.

6. Apparatus according to claim 1 wherein said number of pairs is greater than one.

7. Apparatus according to claim 6 wherein two of said pairs are arranged for multiple reflections therebetween and one pair rotates at one-half the angular velocity of said object divided by the number of reflection of each pair.

8. Apparatus according to claim 7 wherein one of said pairs is stationary.

* * * * *